March 3, 1970 — A. H. EICHHOLZ — 3,498,607
COLLAPSIBLE BICYCLE EXERCISE DEVICE
Filed March 16, 1967
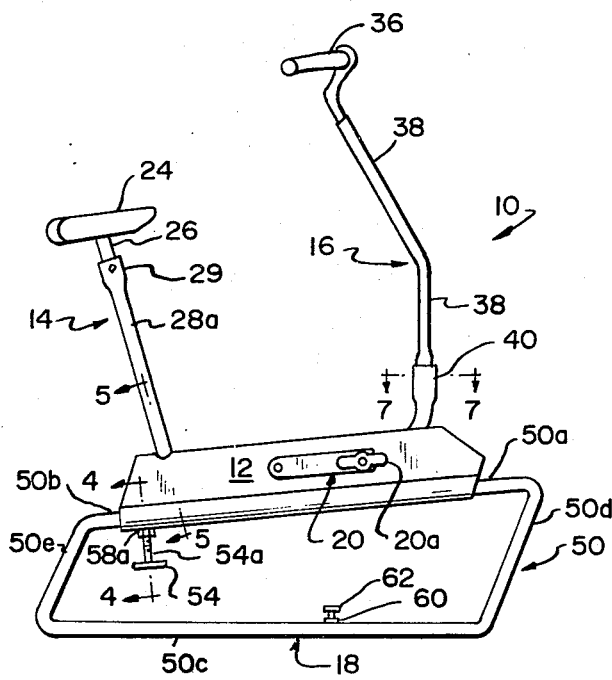
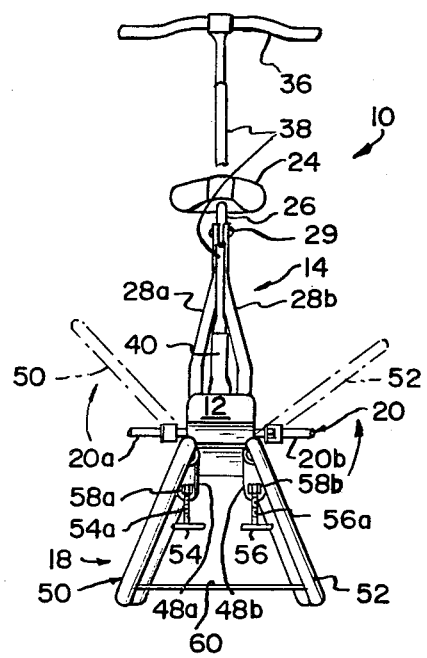
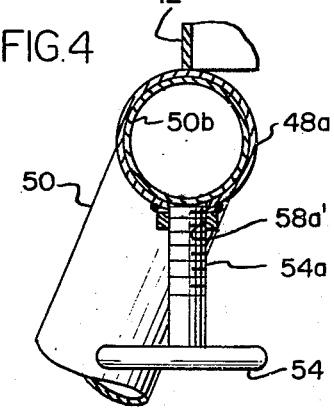
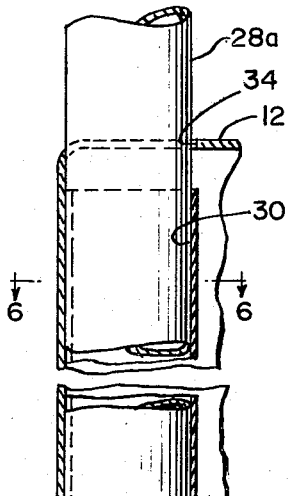
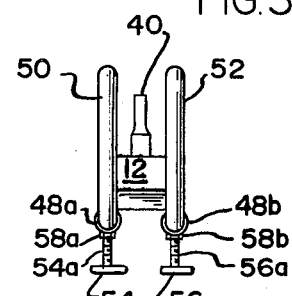
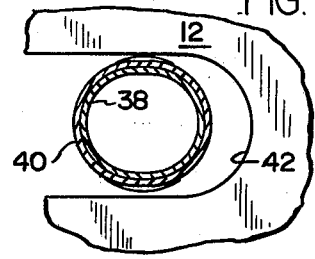
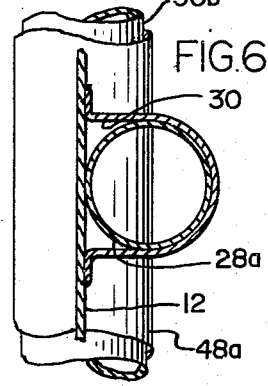
INVENTOR
ARTHUR H. EICHHOLZ
BY Hofgren, Wegner, Allen, Stellman & McCord.
ATTORNEYS.

United States Patent Office 3,498,607
Patented Mar. 3, 1970

3,498,607
COLLAPSIBLE BICYCLE EXERCISE DEVICE
Arthur H. Eichholz, Polo, Ill., assignor to Central Quality Industries, Inc., a corporation of Illinois
Filed Mar. 16, 1967, Ser. No. 623,652
Int. Cl. A63b 69/16, 21/00
U.S. Cl. 272—73      4 Claims

ABSTRACT OF THE DISCLOSURE

An improved exercising device of the bicycle type wherein the supporting elements such as the leg structure, seat structure and handle-bar structure may be easily and readily dis-assembled from or collapsed relative to the assembly to permit simple storage and easy shipment of the device. The handle bar has a post mating in a sleeve of the bicycle frame, and this post and sleeve have an ovoid cross section so that the handle bar can be assembled in either one of two positions opposite one another. The leg structure may be locked in its supporting position.

BACKGROUND OF THE INVENTION

Field of the invention

This invention relates to exercise devices and more particularly to an exercise device of the bicycle type wherein the several components thereof are collapsible or separable relative to the remainder of the assembly to permit facile storage and shipment thereof.

Description of the prior art

Hitherto known exercise machines of the bicycle type wherein a rocking action is imparted to either or both of the handle bar and seat structure responsive to movement of the pedals, have been relatively cumbersome structures, in that the handle bars and seat structure of necessity extend upwardly from the frame or main housing portion a substantial distance to properly seat and orient a user. In addition, the supporting legs for the structure must be a distance above the floor to permit travel of the pedals on the crank arm through a circular path of travel and permit some clearance with respect to the supporting surface. This results in the exercise devices being relatively large and cumbersome when assembled for use. To save storage space and simplify shipping, these devices are usually shipped and sold disassembled. They are relatively difficult for the customer to assemble, and once being so assembled may not be easily disassembled for storage.

SUMMARY OF THE INVENTION

This invention is directed, in brief, to the provision of a bicycle-type exercise device wherein the handle bar, seat and supporting leg structure may be easily collapsed or assembled and disassembled from the remainder of the frame to facilitate shipping and storage, eliminate the need for lengthy assembly by the purchaser, and permit it to be easily and conveniently stored by the purchaser thereof when not in use.

BRIEF DESCRIPTION OF THE DRAWINGS

FIGURE 1 is a side elevational view of the exercise device of this invention;
FIGURE 2 is a front elevational view of the exercise device as shown in FIGURE 1;
FIGURE 3 is a view similar to FIGURE 2 with the exercise device in a collapsed and disassembled storage condition;
FIGURE 4 is a fragmentary enlarged sectional view taken along the line 4—4 of FIGURE 1 showing the relationship between the leg members and a locking means therefor;
FIGURE 5 is a section view taken generally along the line 5—5 of FIGURE 1 showing the relationship between part of the seat supporting structure and the interior of the frame in which the seat supporting structure is positioned;
FIGURE 6 is a sectional view taken generally along the line 6—6 of FIGURE 5; and
FIGURE 7 is a fragmentary enlarged sectional view taken generally along the line 7—7 of FIGURE 1 showing the relationship between the handle bar support and a mating sleeve therefor which is connected to the pedal crank apparatus.

DESCRIPTION OF THE PREFERRED EMBODIMENT

The exercise device 10 of this invention includes a frame 12 with a seat assembly 14 and a handle bar assembly 16, the frame and several assemblies being supported in an elevated condition during use by a leg assembly generally indicated 18. In a typical exercise device, the pedal assembly 20 is rotated by a pumping action similar to that of propelling a bicycle and, by well-known interconnection with portions of the handle bar assembly, the handle bars are caused to rock towards and away from the seat structure so that when the seat is occupied by a user who pumps the pedal assembly 20 while gripping the handle bar assembly 16, the action of the handle bar assembly opposing the pumping action of the user will result in a considerable amount of effort expended by the user. The pedal assembly is of typical bicycle type including pedal members 20a which are attached to the crank arms 20b for establishing a rotary motion resultant from a generally vertical pumping motion imparted by the user.

The seat assembly 14 includes a bicycle-type seat 24 which is provided with a depending post 26 secured between a pair of depending diverging arms 28a and 28b by means of a bolt 29 which extends through the arms 28a and 28b and post 26. The interior of the rear of the frame is provided with a pair of spaced sockets or sleeves 30 (only one being shown in FIGURE 5) which are of a size and shape to generally receive the lower ends of the spaced arms 28a and 28b when telescoped through openings 34 in the top of frame 12. Thus the seat assembly 14 may be simply assembled or disassembled relative to frame 12 by merely axially inserting or withdrawing the arms 28a and 28b from the sleeves 30 in the interior of the frame.

The handle bar assembly 16 includes a bicycle-type handle bar 36 mounted on a post 38 which is telescopically receivable in a socket or sleeve 40. Sleeve 40 is, in turn, connected in the interior of the frame in a conventional fashion to motion transmitting means which is associated with the crank assembly 20 so that as the pedals 20a are pumped, the handle bars 36 will rock to and fro relative to the seat 24. The opening 42 in the top of frame 12 is of sufficient lateral dimension to allow for the to and fro rocking movement of the sleeve 40 responsive to pedaling. Preferably sleeve 40 and post 38 are ovoid rather than round so that the handle bar post may be inserted in the socket in one of two positions spaced 180° apart. Thus the handle bar assembly may be assembled and disassembled relative to the exercise device by mere axial insertion and withdrawal from the socket 40.

The supporting leg assembly 18 is associated with the frame 12 by means permitting the collapse thereof relative to the frame to reduce the overall envelope of the exercise device. For this purpose, the underside of the frame is provided with a pair of generally longitudinally extending spaced sleeves 48a and 48b which rotatably receive the inwardly facing opposite ends, such as 50a and 50b, of a pair of parallelogram-like tubular supporting leg structures 50 and 52. The lower portion of each of the leg structures, such as 50c, is intended for engagement with a supporting surface and the intermediate portions, such as 50d and 50e, connect the lower portion 50c with the ends 50a and 50b, which are swingably received in the sleeves of the frame.

Means are provided for locking the legs in a spread supporting position including a pair of lock handles 54 and 56, each of which has a threaded stem 54a and 56a which is threadably received in a threaded aperture, such as 58a, in nuts 58a and 58b on each sleeve 48a and 48b, respectively, to bring the threaded stems 54a and 56a into abutment with the end portions, such as 50b, of the legs 50 and 52 to frictionally engage the same to hold the legs against movement relative to the frame 12. To further hold the legs 50 and 52 in a spread supporting position, a brace element 60 is provided. The brace element is movably mounted with respect to the legs 50 and 52 such as by means of a threaded post 62 which is threaded into the lower portion of the legs, such as 50c on leg 50, so that the brace 60 may be moved between a position which supports the legs 50 and 52 as shown in FIGURES 1 and 2 and a position removed therefrom to permit the folding of the legs relative to the frame as shown in FIGURE 3.

When the exercise device is in use, the seat assembly 14, handle bar assembly 16 and leg assembly 18 are in the position as shown in FIGURE 1 with the lock handles 54 and 56 and the brace 60 locking the legs in a supporting position. When it is desired to store or ship the exercise device, the handle bar assembly may be disassembled by withdrawing the post 38 from the sleeve 40 and the seat assembly may be disassembled by withdrawing the arms 28a and 28b from the sockets 30 in the interior of the frame. In addition, lock handles 54 and 56 may be unthreaded, and brace 60 removed to permit the leg structure to be swung from the supporting position as shown in FIGURES 1 and 2 to a collapsed position as indicated by the arrows and dotted outline in FIGURE 2 so that the exercise device will assume the compact configuration as shown in FIGURE 3 with the supporting legs inverted relative to the supporting position, and the handle bar and seat assembly removed from the frame. Thus the exercise device may be easily assembled by a customer when first purchased and may be easily disassembled and put away for storage in a relatively compact area, such as a closet or the like, when it is not in use. This is especially helpful to persons who live in limited premises, such as those who occupy apartments or the like, where storage space is limited and facilities for exercising may be equally limited.

The foregoing detailed description has been given for clearness of understanding only, and no unnecessary limitations should be understood therefrom, as some modifications may be obvious to those skilled in the art.

I claim:

1. A bicycle type exercise device comprising: a frame; a seat assembly and handle bar assembly each removably connected to the frame by means of a post and sleeve arrangement for movement between an upright functioning position and a storage position removed therefrom; the handle bar assembly post and sleeve connection being ovoid in transverse section to permit the assembly of the handle bar in one of two positions opposite each other and a supporting leg assembly connected to the frame for supporting the exercise device in a functioning position, whereby the exercise device may be easily assembled for use and disassembled for storage in a compact space by movement of said seat and handle bar assemblies to said storage position wherein the overall envelope of the exercise device is reduced and compacted.

2. A bicycle type exercise device, comprising: a frame; a seat assembly and a handle bar assembly each removably connected to said frame for movement between a functioning position and a storage position removed therefrom; and a supporting leg assembly swingably connected to said frame by means of a sleeve portion on the frame which receives a tubular member of the leg assembly for moving the leg assembly between a supporting position and a storage position wherein the leg assembly is folded inwardly upon the frame; and means for locking the leg assembly in the supporting position including manually operable members mounted in the sleeve portions of the frame for movement toward and away from the tubular portion of the leg members.

3. The exercise device of claim 2 wherein the manually operable members include handles having threaded stems and wherein the frame sleeve portions have threaded apertures in which said stems are threadably received, said apertures being adjacent portions of the leg assembly within the sleeves so that the threaded stems may be brought into and out of frictional engagement with portions of the leg assembly.

4. The exercise device of claim 2 wherein the sleeves at the bottom of the frame open to the front and rear thereof and where the leg assembly includes upwardly and rearwardly returned portions having the tubular ends which are received in the sleeves at the bottom of the frame.

References Cited

UNITED STATES PATENTS

| 1,066,445 | 7/1913 | Beardsley | 280—20 |
| 1,263,249 | 4/1918 | Hoppes | 74—551.1 |
| 2,107,447 | 2/1938 | Marlowe | 272—73 |
| 2,310,345 | 2/1943 | Bell | 297—37 |
| 2,603,274 | 7/1952 | McClernon | 297—37 |
| 3,057,201 | 10/1962 | Jaeger | 272—73 |

FOREIGN PATENTS 76,368  4/1961  France.

RICHARD C. PINKHAM, Primary Examiner

R. W. DIAZ, JR., Assistant Examiner

U.S. Cl. X.R.

297—37